United States Patent
Palmer et al.

(10) Patent No.: US 8,371,594 B2
(45) Date of Patent: Feb. 12, 2013

(54) SPEED CONTROL SYSTEM

(76) Inventors: James Stewart Palmer, Valencia, CA (US); Gregory Harold Smith, Simi Valley, CA (US)

(*) Notice: Subject to any disclaimer, the term of this patent is extended or adjusted under 35 U.S.C. 154(b) by 6 days.

(21) Appl. No.: 12/802,567

(22) Filed: Jun. 8, 2010

(65) Prior Publication Data

US 2010/0314851 A1    Dec. 16, 2010

Related U.S. Application Data

(60) Provisional application No. 61/185,985, filed on Jun. 10, 2009.

(51) Int. Cl.
*B62M 1/00* (2010.01)
(52) U.S. Cl. .............. 280/87.042; 280/11.215
(58) Field of Classification Search ............. 280/7.12, 280/11.27, 11.28, 11.225, 11.204, 11.215, 280/11.231, 22.1, 87.021, 87.041, 87.042, 280/220
See application file for complete search history.

(56) References Cited

U.S. PATENT DOCUMENTS

| | | | | |
|---|---|---|---|---|
| 321,261 A * | 6/1885 | Turnbull | ................ | 280/11.215 |
| 1,933,421 A * | 10/1933 | Elliotte | ................ | 188/2 R |
| 2,051,762 A * | 8/1936 | Vincent | ................ | 280/87.041 |
| 2,865,645 A * | 12/1958 | Levin | ................ | 280/11.205 |
| 3,288,251 A * | 11/1966 | Sakwa | ................ | 188/29 |
| 3,385,608 A * | 5/1968 | Waddell | ................ | 280/11.204 |
| 3,811,535 A * | 5/1974 | Preusser | ................ | 188/29 |
| 3,945,655 A * | 3/1976 | Banks et al. | ................ | 280/11.215 |
| 4,003,582 A * | 1/1977 | Maurer | ................ | 280/11.215 |
| 4,027,890 A * | 6/1977 | Volkmann | ................ | 280/11.207 |
| 4,037,852 A * | 7/1977 | Bayer et al. | ................ | 280/87.042 |
| 4,084,831 A * | 4/1978 | Akonteh et al. | ................ | 280/11.215 |
| 4,088,334 A * | 5/1978 | Johnson | ................ | 280/11.206 |
| 4,127,282 A * | 11/1978 | Gorlach et al. | ................ | 280/87.042 |
| 4,166,519 A * | 9/1979 | Maloney | ................ | 188/29 |
| 4,295,547 A * | 10/1981 | Dungan | ................ | 188/2 R |
| 4,915,403 A * | 4/1990 | Wild et al. | ................ | 280/221 |
| 4,951,958 A * | 8/1990 | Chao | ................ | 280/87.041 |
| 6,079,727 A * | 6/2000 | Fan | ................ | 280/265 |
| 6,213,484 B1* | 4/2001 | Rohner | ................ | 280/87.042 |
| 6,296,082 B1* | 10/2001 | Tsai | ................ | 188/19 |
| 6,820,881 B1* | 11/2004 | Berry | ................ | 280/87.042 |
| 7,597,333 B2* | 10/2009 | Stillinger | ................ | 280/87.041 |
| 8,091,906 B1 | 1/2012 | Chen | | |
| 2010/0314851 A1* | 12/2010 | Palmer et al. | ................ | 280/87.042 |

* cited by examiner

*Primary Examiner* — Katy M Ebner
*Assistant Examiner* — Brodie Follman
(74) *Attorney, Agent, or Firm* — Patent Law Agency, LLC; Peter Ganjian

(57) ABSTRACT

Skateboard speed control is achieved by improved application of a mechanism to provide even force to the wheels by a simplified speed control system. The speed control system is durable, compact, simple, uses minimal components, is ergonomic, and has speed control pads that move in sync while simultaneously tolerating variations in wheel orientation and position while a rider is maneuvering the skateboard.

6 Claims, 4 Drawing Sheets

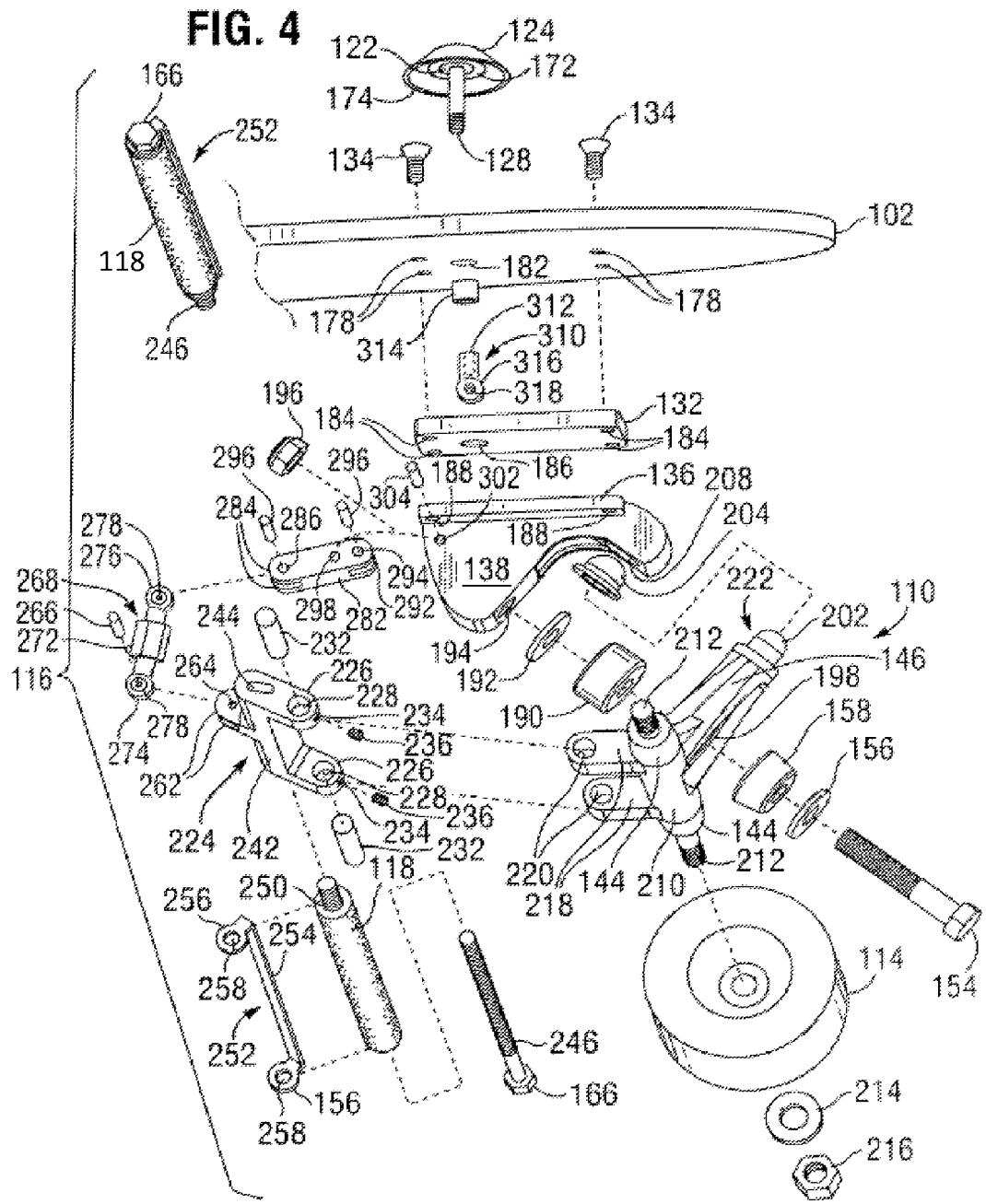

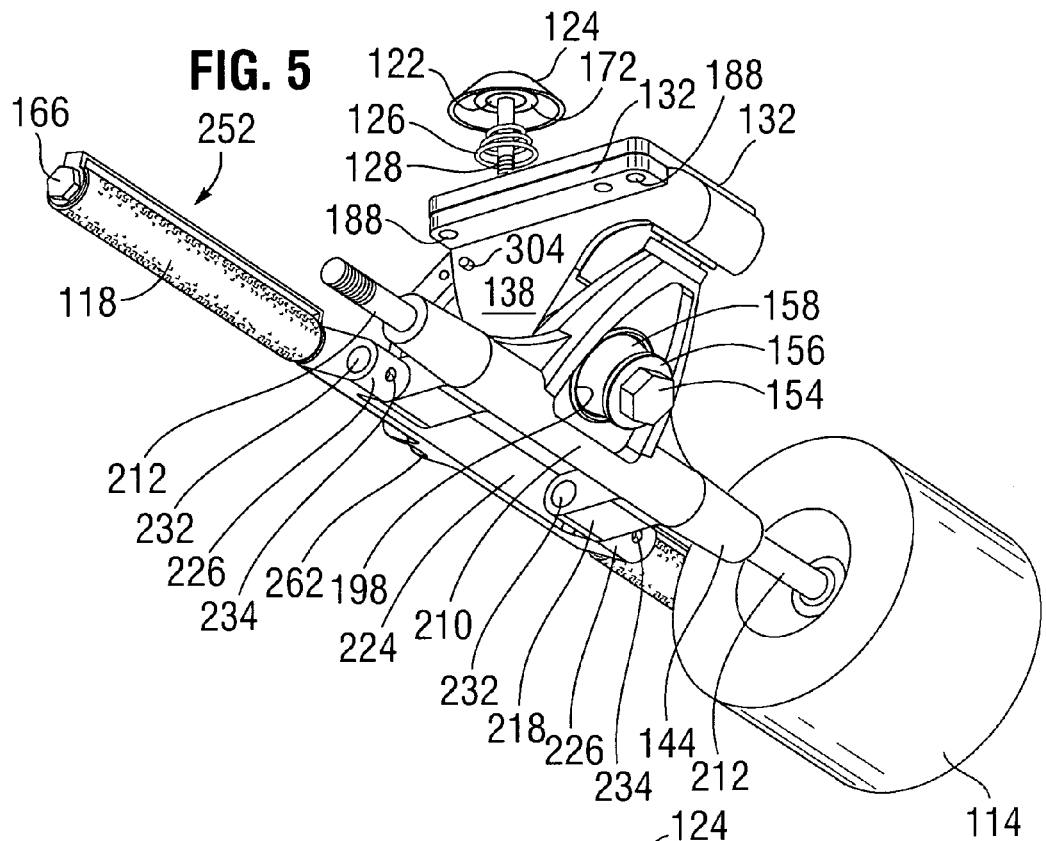
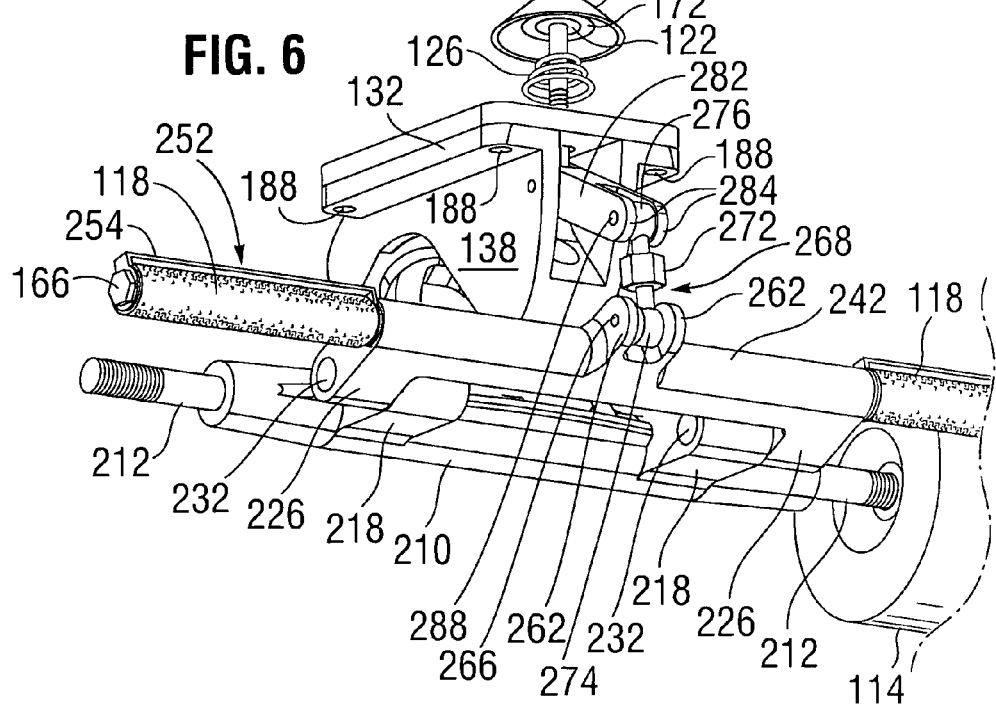

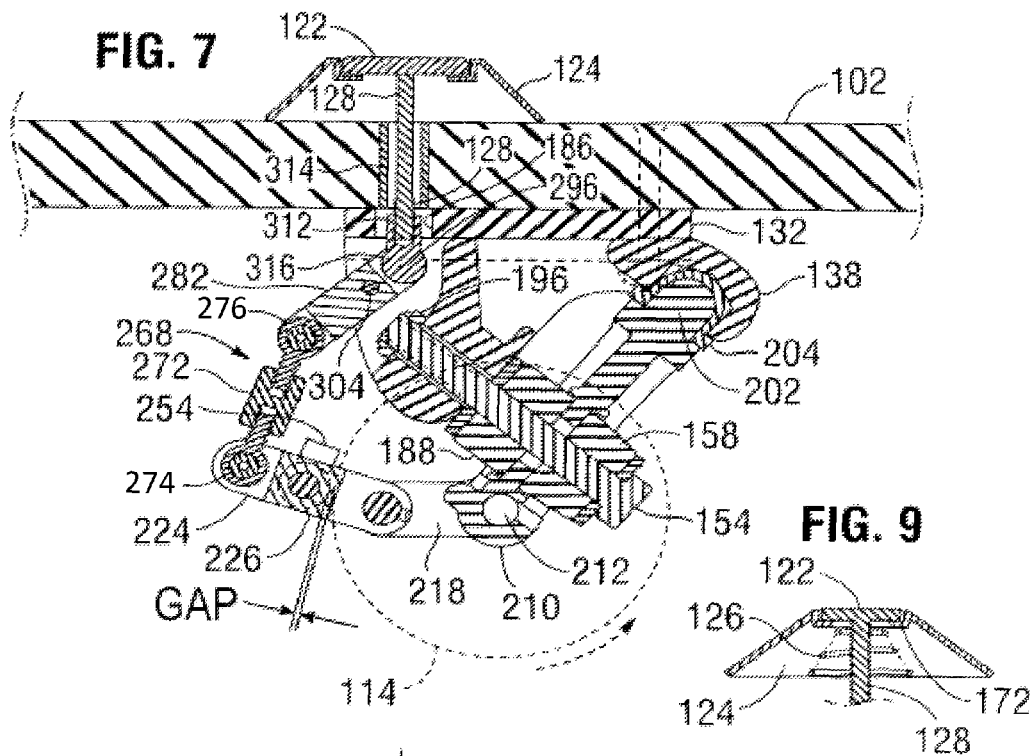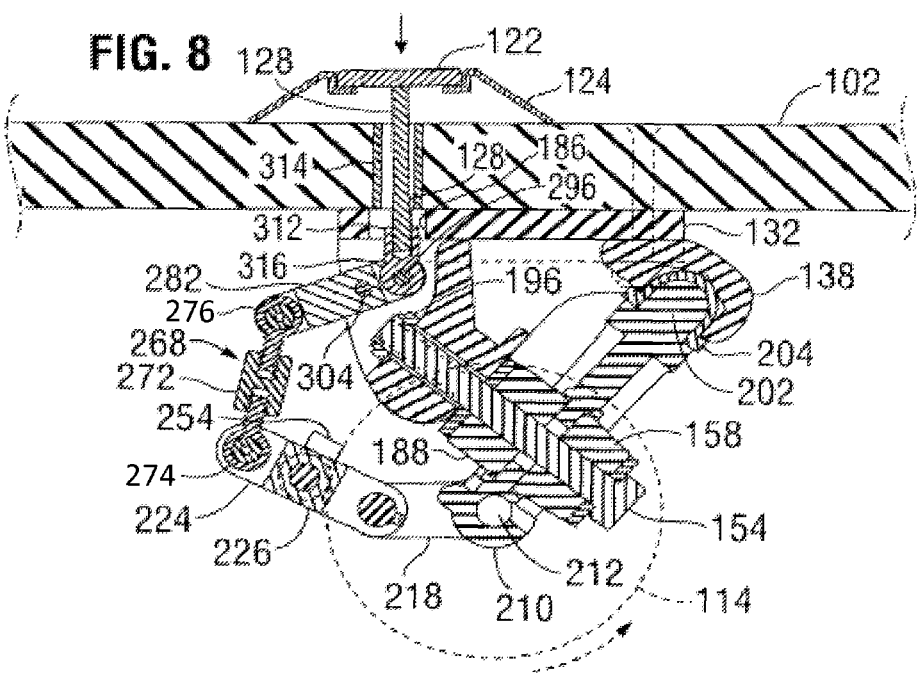

SPEED CONTROL SYSTEM

This application is a continuing application of U.S. Provisional Patent Application No. 61/185,985 filed Jun. 10, 2009.

FIELD OF THE INVENTION

The present invention relates to a mechanism for use with a wheeled vehicle which enables user actuated speed control system.

BACKGROUND OF THE INVENTION

Wheeled vehicles, including skateboards, scooters and other conveyances upon which a user stands, may go out of control for a number of reasons, including the unbridled momentum of both rider and the vehicle. The rider could benefit from speed control, but there are no commercially available controls which are durable, functional, or stable and which don't burden the vehicle or rider with structure which detracts significantly from performance of the vehicle.

Especially with skateboards, the user needs to be able to keep hands free for balance. Any mechanism which would require hand manipulation would seriously impede the ability of the user to balance on the skateboard and may even impede the ability to steer it. Another problem is proportionality of control. Where a control might be manual, perhaps with cable control to the skateboard wheels, it relies upon the user's manual sensitivity to avoid over controlling the speed. A sudden reaction to a condition which might cause flinching in the hand could produce an accident. A cable or remotely manual controlled speed control will not be self-mitigating.

No commercially available remotely controlled speed control possesses all of the needed characteristics for a skateboard system, including proportional control, a control not significantly subject to accidental or unintentional actuation, and a control with self mitigating mechanism components to prevent jamming, and wear reduction structures combined with the ability to adequately control speed. Because skateboards operate in a harsh environment, the needed isolation of a speed control from the negative debris is also not found. Isolation is not found with regard to a range of debris damage from that which may wear the system down rapidly, to that which could jam the wheel rotation abruptly. Toughness and durability is another factor lacking in any commercially available speed controls, and especially in the case of a skateboard which operates in a severe environment. Skateboarders will not tolerate any mechanical system which breaks down easily or which cannot tolerate the harsh skateboarding environment.

SUMMARY OF THE INVENTION

This invention relates to improvements in control of the motion of a skateboard and, more particularly, to control of skateboard maneuverability by an improved application of a speed control to provide force to the wheels by a simplified speed control system. More specifically, this invention relates to an improved speed control system for skateboards that is durable, compact, simple, uses minimal components, is ergonomic, and has speed control pads that move in sync while simultaneously tolerating variations in wheel orientation and position while a rider is maneuvering the skateboard.

The system of the present invention achieves a proportional control by utilizing a mechanical link actuator which has increasing springing opposed resistance as it is actuated. Further, the conic exterior shape of the elastomeric member is such that the actuation link is sufficiently prominent that it can be located by feel, but does not have so high a profile that it can easily "catch" or abruptly stop the movement of the users' foot, including proportional control, a control not significantly subject to accidental or unintentional actuation, and a control with self mitigating mechanism components to prevent jamming, and wear reduction structures combined with the ability to adequately control speed. Because skateboards operate in a harsh environment, the needed isolation of a speed control from the negative debris is also not found. Isolation is not found with regard to a range of debris damage from that which may wear the system down rapidly, to that which could jam the wheel rotation abruptly. Toughness and durability is another factor lacking in any commercially available speed controls, and especially in the case of a skateboard which operates in a severe environment. Skateboarders will not tolerate any mechanical system which breaks down easily or which cannot tolerate the harsh skateboarding environment.

BRIEF DESCRIPTION OF THE DRAWINGS

The invention, its configuration, construction, and operation will be best further described in the following detailed description, taken in conjunction with the accompanying drawings in which:

FIG. 4 is an exploded view of the assembly shown in FIG. 3, and illustrating component parts of the speed control system;

FIG. 5 is a rear assembled view looking upward at the speed control system as seen in FIGS. 1-4;

FIG. 6 is a front assembled view looking upward at the speed control system as seen in FIGS. 1-5;

FIG. 7 is lateral sectional view of the speed control system as seen in FIGS. 1-6 and shown in the un-actuated position;

FIG. 8 is a lateral sectional view of the speed control system as seen in FIGS. 1-7 and similar to the view of FIG. 7 and shown with the speed control being actuated; and FIG. 9 is a sectional view of one embodiment of the pedal, conical shaped elastomeric spring member, and optional spring.

DETAILED DESCRIPTION OF THE PREFERRED EMBODIMENTS

Figure 1:
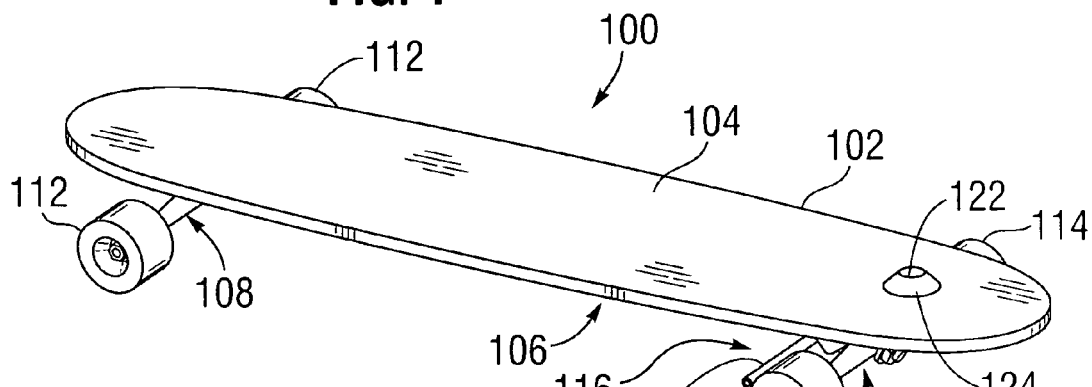
FIG. 1 is a perspective overall view of a skateboard having the speed control system of the present invention, and including an actuation device seen rising above a central rear area of the deck of the illustrated skate board.

Referring to FIG. 1, a perspective overall view of a skateboard 102 having the speed control system of the instant invention is seen. FIG. 1 is an illustration of the skateboard which includes the mechanism of the present invention and the skateboard is broadly denoted by the numeral 100. Skateboard 100 includes a generally rigid board 102 having an upper surface 104 on which the feet of the user are placed in the usual manner to power the skateboard 100 forward and to ride on it.

A conventional front axle assembly 108 is provided on the lower surface 106 of board 102 at the front-end portion thereof. The front axle assembly 108 is conventional and well-known, and enables the skateboard 100 to turn by tilting the generally rigid board 102 laterally to one side or the other. Board 102 of skateboard 100 has and is supported at the rear end of board 102 by a modified rear axle assembly 110 that is provided and operably attached on the lower surface 106 of the board 102 adjacent the rear-end portion thereof. The modified rear axle assembly 110 is conventional and is well-known, and has coupled therewith the speed control system of the present invention. It should be noted that the speed control system of the present invention may also be coupled with the front axle assembly or both the front and rear axle assemblies with adjustments, the details of which are provided below.

Also seen are a pair of front wheels 112 of the front axle assembly 108 and a pair of rear wheels 114 associated with the modified rear axle assembly 110. A speed control system 116 is indicated by arrow and is associated with rear wheels 114 and one of a pair of supported speed control pads 118, which is partially seen just in front of one of the pair of rear wheels 114 and elevated slightly above the center of axis of rotation of the rear wheels 114. Also seen in this first embodiment is a circular structure protruding up above the upper surface 104 of the board 102, is a pedal 122 which is shown as a circular disc surrounded by a conical shaped elastomeric spring member 124 which acts as both a spring and a "lead up" touch and approach system. Conical shaped elastomeric spring member 124, depending upon choice of materials, may or may not needs supplemental action of a spring (to be shown). A number of conical shaped elastomeric spring member 124 may be provided having different spring characteristics, and can be supplemented by a spring (to be shown) to operate with a different characteristic.

A more basic embodiment of a pedal is shown below, but the pedal 122 and conical shaped elastomeric spring member 124 enables a smoother passage of a riders foot to "find or feel" the area in which the pedal 122 is located with a smoother transition of the riders foot onto the top of the pedal 122 so that it may be activated more quickly rather than a more complex leg maneuver to re-lift the leg for later positioning onto the pedal 122. Inasmuch as skateboard riders will develop a subtle sense of touch, the structures 122 and 124 will combine to make repeated ease of foot positioning possible.

The top of pedal 122 may have a top height extending from about twelve to seventeen millimeters above the surface 104 of the board 102 with a height of about fifteen millimeters having been found to work well. When the pedal 122 is depressed vertically, the speed control pads 118 are brought into contact with the pair of rear wheels 114 to slow the forward speed of the skateboard 100.

The mechanical link between the pedal 122 and the speed control pads 116 is such that the pedal 122 may be vertically displaced downwardly about two millimeters before contact of the speed control pads 118 is made with the pair of rear wheels 114 perhaps with an additional half to one millimeter of displacement to provide a range of pressure of the speed control pads 118 against the pair of rear wheels 114 for user control of the speed of the skateboard 100. A spring member may be used which will provide an urging of the pedal 122 upwardly both to provide for release of the engagement of the speed control pads 118 against the pair of rear wheels 114, and which will provide a range of pressure control corresponding to a range of speed control.

In use, the skateboard 100 is operated in the normal fashion and, when the skateboard is up to speed, the user can make turns or maneuvers by shifting his weight and by manipulating the right and left tilt of the board 102 in certain directions to achieve desired turning results, in the same manner as is known for conventional skate boards. In general, during forward riding movement of skateboard, the user may depress a speed control pedal 122, most likely with the heel of the user's foot, to vary the velocity of the skateboard 100 due to the actuation of the speed control system of the invention which in turn applies a speed control force to the wheels. When this occurs, the speed control action will be a logarithmic function of time, tending to decelerate the skateboard 100, and mechanically disadvantaged so that even a riders full weight on the pedal 122 will not cause the speed control system lock any of the wheels 114 or otherwise jam.

This deceleration can be controlled by the selective displacement of a shaft (described below) attached to the speed control pedal 122, for it is possible that the user will not wish to come to a complete stop but merely to slow down during a specific maneuver or to help execute a specific maneuver. The rate of speed decay is a direct function of the pressure and time applied to speed control pedal 122. Further, given the synchronized motion of the speed control system of the present invention with the motion of the axle assembly, the speed control pads of the break system equally contact the both of the wheels of the wheel axle to equally decelerate both rear wheels 114.

Figure 2:
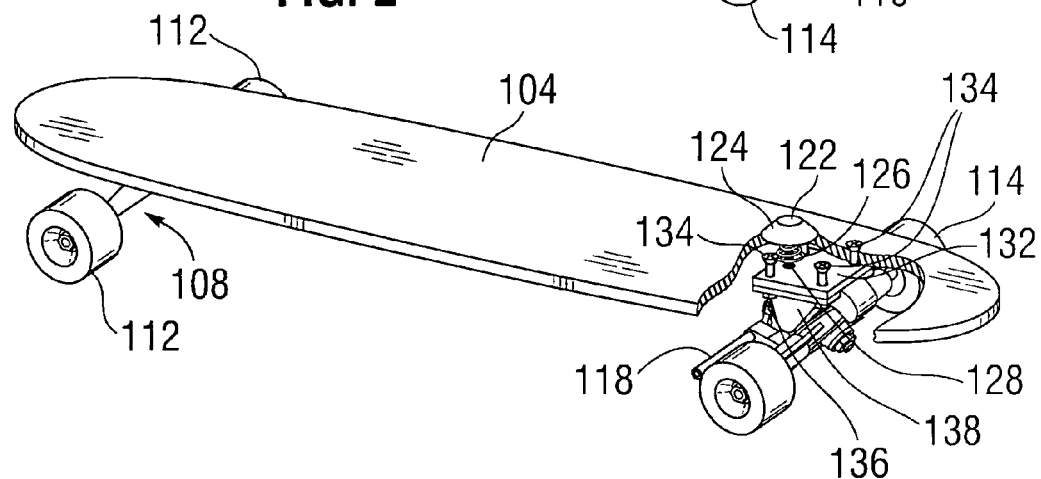
FIG. 2 is a view similar to that shown in FIG. 1 but the illustrating a broken away section of the generally rigid board and which exposes the components to better illustrate their interrelation.

Referring to FIG. 2, a view similar to FIG. 1 is shown, but with a portion of the board 102 broken away in order to show further details before going on to further expanded views. An optional spring 126 is shown having a lower extent which would bear against the board 102, and an upper extent which may bear directly on the underside of the pedal 122. Underneath the pedal 122 and extending through conical shaped elastomeric spring member 124 is an actuator shaft 128 which may have a threaded lower end for ease of adjustment, as will be explained. The top end of the shaft 128 is preferably affixed to the pedal 122 and can be seen extending through a riser plate 132. A series of four threaded members 134 are seen extending into and through side plates 136 of a wheel base plate 138.

Figure 3:
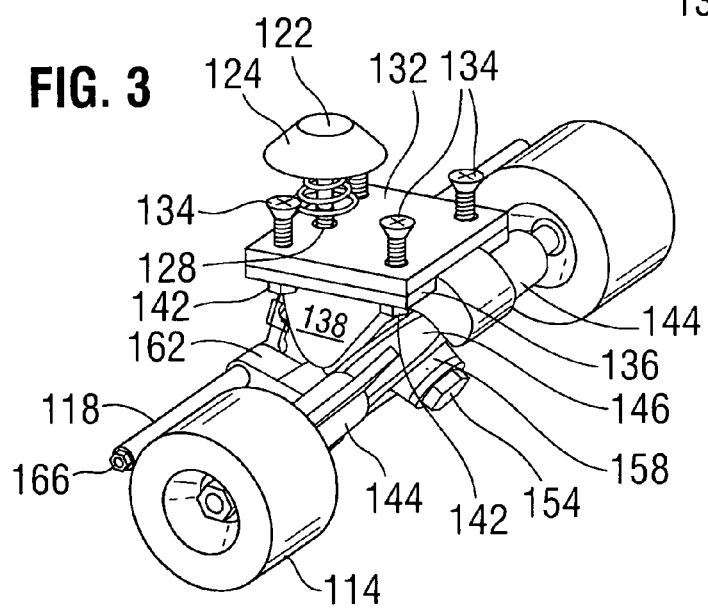
FIG. 3 is an assembled lateral sectional view illustrating the relationship of the friction member with respect to the wheel and the deck actuator and shown in a non-engaging view with respect to the skateboard wheels.

Referring to FIG. 3, an expanded view of the assembly of FIG. 2, and without the remainder of the skateboard 100 is seen. Further detail seen includes a series of nuts 142 which engage the threaded members 134 and which enable threaded members 134 to secure the rear axle assembly 110 and its speed control system 116 to the board 102. The wheel base plate 138 is predominantly of the type found in conventional wheel assemblies. A pair of main wheel axles 144 is seen in FIG. 3 supported by a main axle hanger 146. The main axle hanger 146, in typical fashion supports a main axle pivot bolt 154 which is secured by a nut (not seen in FIG. 3) and against a washer 156, and which in turn compresses an elastomeric bushing 158. In a conventional manner, the main wheel axles 144 can allow the wheel base plate 138 and board 102 to tilt from side to side to enable the main wheel axles 144 to rotate in a horizontal plane to enable the skateboard 100 to be turned.

Forward of the pair of main wheel axles 144, some components of the speed control system 116 are seen, including a bracket extension 162 into which one of the pair of supported speed control pads 118 is seen attached. The speed control pads 118 are attached to the bracket extension 162 by a bolt (not completely seen), preferably having a hex head 166 for strong hold along with facilitated adjustment. The speed control pads 118 present a limited common surface area against the polymeric wheels 114. If the speed control pads begin to wear, and thus form a flat or curved worn away portion, the speed control pads 118 can be rotated by the simple expedient of loosening the hex head 166 to free the speed control pad 118 to loosen, and then manually rotating the speed control pad 118 so that the most recent worn area is moved just enough so that it will not contact the polymeric wheel 114. Because the contact between the speed control pads 118 and polymeric wheel 114 is a narrow line, and because the speed control pads 118 are resistive to wear, it takes many weeks of usage of the skateboard 100 before any significant wear spot can occur. One material for speed control pad 118 which has been found to work well is referred to as a phenolic material commercially available under the trade name "GAROLITE" from EMCO Industrial Plastics, Inc. of Cedar grove, N.J. The phenolic material has been described as "a result of polymerization between layers of paper, canvas, linen, or glass cloth impregnated with synthetic thermosetting resins and this material is an alternative to acrylic because of its high resistance to flexing and good heat tolerance.

Referring to FIG. 4, an exploded view from a bottom perspective illustrates a number of details not previously seen, and the interrelationship of the component parts of the skateboard 100 fitted with the speed control system 116 of the invention. Beginning at the top, the pedal 122 is seen having a portion of its bottom, from the edge and partially inward captured with a radially inwardly directed lip 172. Note that the spring 126 is absent, as the conical shaped elastomeric spring member 124 can act as its own spring. As the pedal 122 is depressed, the lip 172 drives the conical shaped elastomeric spring member 124 down, causing its lower edge 174 to expand circumferentially outward. The counter-force from the springing action is derived from the resistance of the conical shaped elastomeric spring member 124 to flattening. For conical shaped elastomeric spring member 124, the performance will depend upon the material chosen, the angle of the conical section, whether the conical section is straight, bowed or flaring, the thickness, and any internal engagement structures and their orientation for selective engagement, and more.

The board 102 will have a series of securing apertures 178 for accommodating the threaded members 134. In addition, it will have a control shaft board aperture 182 which will ideally be slightly bigger to accommodate the actuator shaft 128. As will be seen, the actuator shaft 128 will be attached to a pivoting link or lever which will provide some front to back displacement of the bottom end of actuator shaft 128 with respect to the board 102. However, since the length of travel of the actuator shaft 128 will be limited, as will the angular pivot of a pivoting link or lever to be described, this translates into a need for the control shaft board aperture 182 (and if present the optional bushing 314) to be only slightly larger than a clearance which would otherwise be needed for the actuator shaft 128.

Below the board 102 is seen an optional riser plate 132. Riser plate 132 also contains a series of riser plate through apertures 184, and a control shaft riser plate aperture 186 which should be about as large or larger than the rod end 310. Similar to control shaft board aperture 182, the control shaft riser plate aperture 186 should be oversized to allow clearance for the rod end 310. Below the riser plate 132, the wheel base plate 138 side plates 136 are seen as having side plate through apertures 188 through which the lower ends of threaded members 134 pass before they engage nuts 142 (which are not shown in FIG. 4).

Other structures are seen which are independent of the speed control system 116 and include another elastomeric bushing 190, and a further compression washer 192. The wheel base plate 138 is seen as having a through bore 194 through which a threaded member as the main axle pivot shaft 152 extends and to be secured using a nut 196 secured within a cavity opening (the cavity opening to be shown later). The axle assembly has a main aperture 198 which has indentations for seating the elastomeric bushing 158 and the elastomeric bushing 190. To one side and lateral to the main aperture 198 a pivot 202 is seen, and which is shown in dashed line alignment with a pivot cup 204, with the pivot cup being aligned with a pivot cup aperture 208 in the wheel base plate 138. Laterally to the other side of the main aperture 198 an axle crossing structure 210 is seen. On the outside of the main wheel axles 144 are the wheel threaded axle portions 212 are seen. One of the rear wheels 114 is seen, and it is to be attached onto the wheel threaded axle portions 212 and secured by a wheel washer 214 and wheel nut 216 when assembled.

The portions of the rear axle assembly 110 thus far described are generally those found in absence of a speed control system 116. The axle crossing structure 210 has been modified for the purpose of speed control system 116 with the addition of a pair of projections 218 which together form a hinge base. The projections 218 each have a through bores 220. Both the angle and length of the projections 218 provide a positioning of the axis of the through bores 220 which in turn sets the radial center of pivot with which the pair of supported speed control pads 118 are applied against the rear wheels 114. The structures including main wheel axles 144, main axle hanger 146, main aperture 198, pivot 202, pivot cup 204, pivot cup aperture 208, axle crossing structure 210, and wheel threaded axle portions 212 forming an axle pivot assembly 222 also known as a hanger assembly.

To the left of the rear axle assembly 110 a speed control pad hinge 224 is seen. The speed control pad hinge 224 has three functions. First it supports the pair of supported speed control pads 118, second, it has a support and pivot axis from the center of the through bores 220 and third it connects to a link (to be shown) back to the speed control pedal 122. The speed control pad hinge 224 has a pair of projections 226 each having a through bore 228. Pair of hinge cylinders 232 each fit through the bores 220 of the projections 218 and bores 228 of the pair of projections 226 of the speed control pad hinge 224. The result is a fit that is so close as to dictate the pivot action of the speed control pad hinge 224 with respect to the rear axle assembly 110 so that the pair of supported speed control pads 118 approach the pair of rear wheels 114 stably and precisely each time. Each of the projections 226 is fitted with threaded set screw apertures 234, each which leads into the bore 228. A pair of set screws 236 each engage a respective one of the threaded set screw apertures 234 so as to force impinge on the hinge cylinders 232 and hold them into place. One possible arrangement for set screw holding need be made for each hinge cylinder 232 and it could have also been provided for on the projections 218 of the rear axle assembly 110.

The projections 226 of the speed control pad hinge 224 depend from a central support 242. Central support 242 preferably includes a bore slot 244. A long threaded member 246 extends through a bore 250 in the speed control pad 118 and with the engagement head 166 secures the speed control pad 118 to the central support 242. The bore slot 244 may include a threaded nut or other structure (not shown) accessible through the bore slot 244 to engage the long threaded member 246 yet allow it to laterally translate forward and rearward to bring the pair of supported speed control pads 118 toward and away from the pair of rear wheels 114. When the long threaded member 246 is tightened to compress the speed control pad 118 in place it cannot move in the bore slot 244. Bore slot 244 enables an additional level of adjustability.

An optional rock deflector 252 is shown as having an angled main deflector 254 with a pair of angled ears 256, with each of the angled ears 256 having an aperture 258 such that when the rock deflector 252 is brought near the speed control pad 118, the apertures 258 of the angled ears 256 align with the bore 250 of the speed control pad 118. The rock deflector 252 will ride with the speed control pad 118 as it approaches to engage the rear wheel 114, and provides a structure having more normal angle with respect to the surface of the rear wheel 114 to help deflect any rocks or debris away before such rocks or debris can approach the cylinder to cylinder geometry which exists between the speed control pad 118 and rear wheel 114.

The speed control pad hinge 224 is operably connected to the pedal 122 through a series of mechanical links. Speed control pad hinge 224 includes a pair of spaced apart ears 262 at its forward side, with each having a lateral aperture 264 for insertion of a pivot pin 266. An adjustable heim joint 268 is seen as having a hexagonal barrel longitudinal adjustment member 272 which can be fine adjusted by the user to set the axial distance between two heim joint ends 274 and 276. A heim joint is a mechanical articulating joint which may include a casing surrounding a ball swivel, with the ball swivel having an opening for attaching other hardware. The hexagonal barrel has a left and a right hand thread to couple with each of the ball joint ends which allows axial adjustment, and which doesn't have to be hexagonally shaped. Each of the two heim joint ends 274 and 276 include a pin aperture 278. Pivot pin 266 extends through the two lateral aperture 264 and the pin aperture 278 to capture the heim joint between the pair of spaced apart ears 262 of the central support 242 of the speed control pad hinge 224.

A pivot link 282 has a first end having a pair of ears 284 each having an aligned aperture 286 and a locking pin 296, and a second end having a pair of ears 292 each having an aligned aperture 294 and a locking pin 296. The pivot link 282 has a pivot bore 298. To the right of the pivot link 282, the wheel base plate 138 can be seen as having one of a pair of through apertures 302. A through lever pin 304 can engage through a first through aperture 302, and thence through the pivot bore 298 of the pivot link 282, and then through the through aperture 302 on the other side of the wheel base plate 138 (not seen in FIG. 4). Note that pivot bore 298 is located to one side of the pivot link 282 and closer to aligned apertures 294 than to aligned apertures 286. This causes a downward force on aligned apertures 294 to transmit a lesser ratio of upward force on the aligned apertures 286.

Above the optional riser plate 132 a rod end fitting 310 is seen. The optional riser plate 132 will have a control shaft riser plate aperture 186 which is sized to accommodate rod end fitting 310 to enable the highest degree of angular movement of the rod end fitting 310 with its supported actuator shaft 128. The rod end fitting 310 has an internally threaded part 312 for threadable engagement with the lower threaded end of actuator shaft 128. The actuator shaft 128 will fit through and be guidably supported by an optional wear sleeve 314. As will be explained, the tolerance between the actuator shaft 128 and the wear sleeve 314 should be close enough for guiding control and yet loose enough to allow and tolerate some angular movement of the actuator shaft 128 within the optional wear sleeve 314. This can be more clearly illustrated with respect to FIG. 7. The other part of the rod end fitting has a lower end 316 which includes a pin aperture 318. The locking pin 296 will extend through one of the aligned apertures 294 of the pivot link 282, and then through the pin aperture 318 of the rod end fitting 310, and then through the other aperture 294 of the rod end fitting 310 to complete a pivoting connection between the rod end fitting 310 and the pivot link 282. As can be seen, the radius of pivot action between the pivot bore 298 and the aligned apertures 294 is small, and that even a maximum pivot displacement of the end of the pivot link 282 at the aligned apertures 286 will be severely limited.

In an upper pivot direction, angular displacement will be limited by potential contact with either or both of the underside of the board 102 and riser plate 132. At the lower pivot direction, angular displacement will be limited by potential contact against either or both of the end of the main axle pivot bolt 154 or the nut 196. These structures are not used to limit the degree of pivot of pivot link 282, but illustrate the confines of even an un-adjusted and unlimited pivot. The extent of pivot action will be pivot displacement allowed by a normal, un-actuated pedal 122, versus the space of travel between the pair of supported speed control pads 118 and the pair of rear wheels 114.

Adjustment of the length of the mechanical linkage between the un-actuated pedal 122 and speed control pads 118 can be done by turning hexagonal barrel adjustment member 272 of the adjustable heim joint 268, as well as by turning actuator shaft 128 more deeply into rod end fitting 310. It is understood that adjustment could be had at other points, but these two adjustments enable a user to set the performance of the speed control system 116. When actuator shaft 128 is backed out of the rod end fitting 310, a potential longer actuation stroke of the pivot link 282 is possible. Conversely, turning the actuator shaft 128 into the rod end fitting 310, results in raising the rest position of the aligned apertures 286 of the pivot link 282, leaving it with a shorter upward stroke. Separately, adjusting the hexagonal barrel adjustment member 272 of the adjustable heim joint 268 determines the rest clearance of the pair of supported speed control pads 118 in front of the rear wheels 114.

FIG. 5 is a rear assembled view looking upward at the speed control system as seen in FIGS. 1-4, but shown in assembled view and without the board 102. Some details of the mechanism are seen, including the manner with which the speed control pad hinge 224 will be lifted upwardly and toward the rear wheels 114. FIG. 6 is a front assembled view looking upward at the speed control system as seen in FIGS. 1-5, and gives a most direct view into the operating mechanism.

Generally, several aspects of the speed control system 116 are noted. First, the interconnection mechanism of the speed control system 116 includes all of the components from the pedal 122 to the pair of supported speed control pads 118 and need not be subdivided into component sections including an actuator and hinge mechanism.

It should also be noted that speed control pads 118 move in sync with variations in turn orientation and position of the rear wheels 114 that are coupled with the rear axle assembly 110. It may be noted here that the pair of supported speed control pads 118, central support 242, projections 218 and pair of projections 226 are all linked to the axle pivot assembly 222 and thus move with the rear wheels 114. However, the linkage from pedal 122, wheel base plate 138, and pivot link 282 are all attached and move with the board 102. The linkage between the pivot link 282 and the central support 242 cannot be rigid. As the board 102 tilts to cause the rear axle assembly 110 to both turn and become angularly displaced with respect to the board 102, the two helm joint ends 274 and 276 connected to the adjustment member 272 are able to both withstand those angular displacements and still permit operation of the speed control system 116.

Also note that speed control pedal 122 is biased and maintained in an upwardly protruded position by the conical shaped elastomeric spring member 124 and/or optional spring 126, as well as the weight of the speed control pad hinge 224 and mechanically advantaged (for biasing) pivot link 282. Further, biasing could also occur through any resilient device, and need not be limited to the components illustrated. A stroke distance of the speed control pedal 122 in relation to an upper surface 104 of the board 102 is adjustable to enable variations in speed control force of rear wheels 114.

In addition, special attention is drawn to the speed control pedal 122 and its control shaft board aperture 182. The actuator shaft 128 is threaded through the control shaft board aperture 182 during assembly of the speed control system 116. The actuator shaft 128 should be centered in the control shaft board aperture 182 and the control shaft board aperture 182 needs to be oversized due to the fact that the rod end fitting 310 is attached to pivot link 282. It can be said that as the speed control pedal 122 is rotated to one of clock and counter clock directions, the speed control pedal 122 moves along a reciprocating path associated with a longitudinal axis of the actuator shaft 128, thereby adjusting the distance of the speed control pedal 122 in relation to the upper surface 104 of the board 102. The actuator shaft 128 is threaded to enable an adjustment for a distance between the speed control pedal 122 and the upper surface 104 of the board 102, with the actuator effectively resting on the pivot link through the rod end fitting 310. As the distance between speed control pedal 122 and the upper surface 104 of the board 102 may be decreased due to rotation of the speed control pedal 122, the amount of the speed control force finally applied is also decreased. This is so because as the distance between the speed control pedal 122 and the upper surface 104 of the board 102 is decreased when the pedal 122 is rotated, the movement or the displacement of the pedal 122 from its rest position to the full actuation position is shortened or further limited or restricted. This shortened (or further restricted) displacement or movement translates into a smaller displacement or movement of all interconnected components, which, in turn, translates into a shorter (or limited) displacement of speed control pads from their respective rest positions, providing a lighter impingement or contact (lighter speed control force) of the speed control pads with the wheels for softer speed control. It should be noted that if the speed control pedal 122 is adjusted to a point where the speed control pedal 122 touches the upper surface 104 of the board 102, there will be zero speed control power available (no more room left for displacement or move of the pedal 122 to move the actuator shaft 128).

The heim joints, such as two heim joint ends 274 and 276, enable the angular differences above which allow enabling the speed control system 116 to move in sync with any extreme angular or rotational motion of the board 102. This facilitates the translation of the speed control force from the pedal 122 the rear wheels 114 along with simultaneous synchronized motion of the speed control system in relation to the rear axle assembly 110. The angle of the pivot link 282 may be varied, depending on the effective length of the actuator shaft 128. The heim joint ends 274 and 276 are substantially identical. It should be noted that the mechanical links used here such as two heim joint ends 274 and 276 may be substituted with, for example a cable, chain or any flexible connection.

Note that the pivot link 282 includes a fulcrum, which provides a mechanical force disadvantage shown (or could have a mechanical advantage) in actuating the interconnection mechanism between it and the speed control pads 118. The through lever pin 304 couples the pivot link 282 with the wheel assembly bracket 138 and, which defines and functions as the fulcrum. The pivot link 282 acts through the adjustable heim joint 268 which is pivotally connected to the speed control pad hinge 224. Causing the adjustable heim joint 268 to shorten will cause the speed control pads 118 to ride closer to the rear wheels 114 and cause speed control to begin earlier during the downward travel of the pedal 122. Lengthening the adjustable heim joint 268 will cause speed control to begin later during the downward travel of the pedal 122 and only after more pressure has been exerted on pedal 122.

The wheel base plate 138 includes some operating space within which the pivot link 282 may operate. The distal ends of the through lever pin 304 are coupled with the lateral walls of the bracket 138, and secured within by a pair of oppositely located through apertures 302. The speed control pad hinge 224 may include a T-configured type of hinge or the pivot action may occur with respect to some other structure to which the adjustable heim joint 268 may be attached. Here, a set of lateral barrels or pair of projections 226 extend from another set of structures as pair of projections 218 to set the pivot axis of the speed control pad hinge 224, rather than some other commonly connected structure. Alternatively, the adjustable heim joint 268 can be attached to other and different points on the speed control pad hinge 224. Although the pair of projections 226 are illustrated, a single extension member may be used instead of the two illustrated. Similarly, although the pair of projections 218 are illustrated, a single extension member may be used instead of the two illustrated. Similarly, the speed control shaft 128 may or may not be a single piece, but can comprise of two individual pieces, and the manner of connection into the linkage need not be a threaded connection but of some other type. However it has been found that a speed control shaft 128 which is threaded can provide a preferred stability and adjustability. Regardless, the speed control pad hinge 224 creates the leverage to transfer and translate the speed control force of the pedal 122 into a motion to move the speed control pads 118.

It should be noted that in this instance, the projections 218 and 226 provide a sync motion with respect to the rear axle assembly 110. The speed control pad hinge 224 moves the pair of supported speed control pads 118 even when the board 102 is tilted as in a turn.

Much of this is because of the mechanical controllability and angle forgiveness of the two heim joint ends 274 and 276.

As an alternative to the long threaded member 246, a speed control shaft (not shown) can be made of a single piece speed control pad hinge 224 that extends a full length of the rear axle assembly 110, from exterior distal end of a first rear wheel 114 to exterior distal end of the other rear wheel 114, substantially mimicking the structure and motion of the axle assembly to move in synchronization with the motion of the axle assembly.

Referring to FIG. 7, a side sectional view illustrates a version of the speed control system 116 utilizing a pedal 122 and the conical shaped elastomeric spring member 124, but without the optional spring 126. FIG. 7 illustrates a condition in which the speed control system 116 is in the unactuated condition. Note that a some annular gap is left between the combination of the rod end fitting 310 and wear sleeve 314. This excess surrounding clearance space may be provided because of the fact that the actuator shaft 128 changes its angle, even if only slightly, throughout its path of travel, even where that path of travel is short. As the pivot link 282 swings through its arc around the pivot bore 298, a point slightly beyond the tip end of the base of the actuator shaft 128 will travel through a small arc about a horizontal axis, requiring a little clearance. Viewing the rod end fitting 310 from the perspective of FIG. 8, its base angularly moves slightly fore and aft with respect to the board 102 due to the arc path of the pinned connection of the rod end fitting 310 to the pivot link 282.

Note that the pair of projections 218 place the point of pivot of the speed control pad hinge 224 generally horizontally parallel and forward of the axis of the wheel threaded axle portions 212. The speed control pads 118 is positioned in front of the wheels 114, and above the wheel threaded axle portions 212 of the rear axle assembly 110 to prevent even the smallest probability of a lock up of the wheels during speed control. On a forward motion, if the speed control pads 118 are going to be mounted ahead of the front of the wheels (rear or aft axle assemblies), the speed control pads 118 should be above the wheel axle, otherwise skateboard performance would suffer and the mechanical components would tend to obstruct and be obstructed by other objects. Further, The speed control pads 118 may be positioned aft the wheels (aft taken with respect to forward motion of the skateboard 100), in which case, the shaft would generally, given the design of the invention, be located below the wheel axle of the axle assembly to prevent even a small probability of lock up of the wheels during speed control. On forward motion, if the speed control pads 118 were to be mounted on the back of the wheels (rear or aft axle assemblies), the speed control pads 118 should be below the wheel axle. The point is for the speed control system 116 speed control pads 118 to be pushing against the rotation of the wheels 114, and for the rotational momentum of the wheels 114 to be pushing the speed control pads 118 away from the wheel.

With the geometry seen in FIG. 8, a lifting of the speed control pad hinge 224 from a generally horizontal position causes it to approach wheel 114 at an angle such that engagement of the pair of supported speed control pads 118 onto the wheels 114 occurs in a clockwise direction which is opposition of the normal counterclockwise rotation of the wheels 114. In other words, the speed control pads 118 pivot toward the wheels 114 such that continued counterclockwise motion of the wheels tends to push the speed control pads 118 back rather than to cause them to form a cascading lock onto the wheels 114. This mechanical principle employed onto the speed control system 116, along with mechanical force disadvantage from the pedal 122 through to the force applied to the speed control pad hinge 224, insures that a user who depresses the pedal will have only a slowing force applied to the wheels 114. Part of this mitigation of force is through the combination of spring 126 and conical shaped elastomeric spring member 124, or both; the pivot ratio of the pivot link 282, the decreasing leverage and pull that the pivot link 282 can exert on the speed control pad hinge 224 at the point where the pair of supported speed control pads 118 begin to contact the rear wheels 114, and the counter force of the approach of the speed control pads 118 on the counter-rotating wheels 114. The result is that no jamming or binding is had and that speed control is had through a gentle slowing even where the rider's whole weight is impressed upon the pedal 122.

The speed control pads 118 are ideally made of sacrificial material to minimize deterioration of the wheels. Non-limiting example of material used may include GAROLITE material, which is a well-known off-the-shelf product mentioned previously. The purpose of using sacrificial material is to minimize damage to the wheels during speed control. In other words, it will prevent the wheel from wearing out on account of the speed control activity. That is, the sacrificial material is expected to wear out before the rear wheels 114 will wear out. Further, GAROLITE is known to be heat resistant. That is, if riding the board down hill and applying the speed controls, the wheels and the speed controls, and in particular the speed control pads 118 will not be significantly heated. The speed control pads are substantially cylindrical with an axial through-hole, with the long threaded member 246 inserted inside the axial bore 250 of the speed control pads 118. The long threaded member 246 includes the engagement head 248 for locking the speed control pads 118 with respect to the speed control pad hinge 224, preventing the speed control pad 118 from rotation, slipping, and falling out. It should be noted that the cylindrical shape for the speed control pads 118 is preferred because as the speed control pads 118 wear, the engagement head 248 of the long threaded member 246 can be loosened to rotate the speed control pads to a fresh un-worn section, and re-locked for continued use.

Referring again to FIG. 7, in the un-actuated state, the gap between the pair of supported speed control pads 118 of the pad hinge 224 and the wheels 114 is ideally very short, usually one half to one millimeter of gap (see FIG. 7). This short distance tends to block any but the very smallest particles of debris from lodging between the supported speed control pads 118 in front of the rear wheels 114. A small piece of debris on the order of one millimeter or less would tend to roll over the speed control pad 118 as the rear wheel 114 turned near it. Larger size debris would tend to possibly "pop" out of the narrow space between the speed control pads 118 and rear wheel 114. However, the presence of an angled surface with the same adjacency to the rear wheels 114 as the speed control pads 118 will further tend to reject smaller debris. Under normal usage, the provisions of a member like the angled main deflector 252 at the same distance from wheel 114 as the speed control pads 118 will result in significant rejection of debris which might otherwise reach the tapered space between the wheel 114 and the speed control pads 118.

Referring to FIG. 8, a side sectional view is seen similar to that of FIG. 7, but where the speed control pads 118 are engaging the rear wheels 114. As the speed control pads 118 begin to move closer to the wheel 114, the gap between the angled main deflector 254 and the wheel 114 similarly begins to close. The same enhanced debris rejection rate, but for a smaller size of debris will be experienced as the main deflector 254 closes toward the wheel 114. At the point of maximum speed control, when the speed control pads 118 are invading the space of the elastomeric wheel 114, the main deflectors 254 should touch the rear wheels 114. The edge of the main deflectors 254 nearest the rear wheels 114 should assume a slight down angle so that it barely drags the rear wheels 114. This will prevent squeaking or chattering between the main deflectors 254 and rear wheels 114.

FIG. 9 is a sectional view of one embodiment of the pedal 122, conical shaped elastomeric spring member 124, and optional spring 126. Recall that the actuator shaft 128 is threaded. This helps in both assembling and adjusting the components of the speed control system 116. FIG. 9 also better illustrates the extent of the radially inwardly directed lip 172 and how it captures and causes the conical shaped elastomeric spring member 124 to be held down onto the upper surface 104 of the skateboard 100. The initial resistance will also depend upon the conical angle of the conical shaped elastomeric spring member 124. Further, a user may have, or the speed control system 116 may be provided with a set of several optional springs 126 to optimize performance of the skateboard 100. It should be noted that pedal 122 can be molded into a conical shape to be formed as one unit.

The speed control system 116 of the present invention can also be detachably mounted on many types of existing skateboards (not shown) as a retrofit. Thus, the speed control system 116 of the present invention can be packaged and sold as a kit separate from a previously purchased or other conventional skateboard. This is possible because the speed control system 116 of the present invention can be detachably coupled with one or both the rear or front axle assemblies. In either case, a very small hole as a control shaft board aperture 182 will need to be drilled in the generally rigid board 102 to receive the actuator shaft 128 shaft of the pedal 122.

The speed control system 116 of the present invention can easily be secured in place on an existing skateboard with a minimum of effort.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112.

The detailed description set forth below in connection with the appended drawings is intended as a description of presently preferred embodiments and is not intended to represent the only forms in which the present invention may be constructed and or utilized.

The drawings are to be used for the purposes of exemplary illustration only and not as a definition of the limits of the invention. Throughout the disclosure, the word "exemplary" is used exclusively to mean "serving as an example, instance, or illustration." Each embodiment is "exemplary" and should not be construed as preferred or advantageous over other embodiments.

While the preferred embodiments of the invention have been shown and described, it will be understood by those skilled in the art that changes of modifications may be made thereto without departing from the true spirit and scope of the invention.

We claim:

1. A speed control mechanism for use in conjunction with a skate board and comprising:
    a rear axle assembly for mounting to a skateboard including an axle member turnably pivotal with respect to a wheel base plate, the axle member including pair of rear wheels rotatably supported by an axle member;
    an axle projection extending from the axle member having a first end for providing pivotal attachment at a first pivot axis and a second end connected to the axle member;
    a speed control pad hinge having a projection having a first end for providing a pivot engagement with the axle projection at the first pivot axis of the axle projection and a second end;
    a speed control pad supported by the second end of the speed control pad hinge for contacting the skateboard rear wheel for controlling forward speed of the skateboard; and
    a mechanical linkage, for enabling control through the wheel base plate and to the speed control pad hinge and speed control pad for controlling contact and pressure of the speed control pad hinge toward the wheel regardless of whether the wheel base plate is angularly displaced from the axle member.

2. The speed control mechanism as recited in claim 1 wherein the mechanical linkage includes at least one articulating ball joint.

3. The speed control mechanism as recited in claim 1 wherein the axle member has a wheel axis and wherein the first pivot axis is generally horizontally parallel to the wheel axis when the speed control mechanism is mounted to a board to form a skateboard.

4. The speed control mechanism as recited in claim 1 wherein the mechanical linkage further comprises:
    a pedal for extending above a board of a skateboard;
    a pedal actuator shaft for extending through said board within an area of said base plate;
    a pivot link , pivotally supported by the wheel base plate and having a first end pivotally supporting the pedal actuator shaft and a second end;
    an adjustable heim link having a first end connected to and angularly pivotable with respect to the second end of the pivot link and a second end connected to and angularly pivotable with respect to the speed control pad hinge.

5. A speed control mechanism, comprising:
    a pedal that extends above a board of a skateboard;
    a pedal actuator shaft that extends through the board within an area of a wheel base plate;
    a pivot link pivotally supported by the wheel base plate and having a first end pivotally supporting the pedal actuator shaft and a second end;
    an adjustable heim link having a first end connected to and angularly pivotable with respect to the second end of the pivot link and a second end connected to and angularly pivotable with respect to a speed control pad hinge.

6. A speed control mechanism, comprising:
    an axle member;
    an axle projection that extends from the axle member having a first end that pivotally attaches at a first pivot axis and a second end connected to the axle member;
    a speed control pad hinge having a projection that has a first end that pivotally attaches with the axle projection at the first pivot axis of the axle projection and a second end;
    a speed control pad supported by the second end of the speed control pad hinge for contacting a skateboard rear wheel for controlling forward speed of a skateboard.

* * * * *